United States Patent [19]

Robinson et al.

[11] Patent Number: 4,675,683
[45] Date of Patent: Jun. 23, 1987

[54] SPENT HUNTING ARROW LOCATING MEANS

[76] Inventors: Charles R. Robinson, P.O. Box 51, Council, Id. 83612; Ben A. Robinson, Jr., 10985 Neglev Ave., San Diego, Calif. 92131; Tamara Robinson, P.O. Box 51, Council, Id. 83612

[21] Appl. No.: 717,124

[22] Filed: Mar. 28, 1985

[51] Int. Cl.$^4$ .............................................. G01S 1/08
[52] U.S. Cl. .................................. 342/386; 342/448; 342/450; 273/416
[58] Field of Search ............... 273/183 C, 183 R, 416; 343/386, 419, 448, 450; 455/98

[56] References Cited

U.S. PATENT DOCUMENTS 3,790,948  2/1974  Ratkovich ........................... 343/386
4,340,930  7/1982  Carissimi ......................... 273/416 X

OTHER PUBLICATIONS

P. Klopsteg, "The Physics of Bows and Arrows"; *American Journal of Physics*, (8/43, p. 189).

*Primary Examiner*—Thomas H. Tarcza
*Assistant Examiner*—Bernarr Earl Gregory
*Attorney, Agent, or Firm*—Frank D. Gilliam

[57] ABSTRACT

A battery powered radio transmitter of a cross-sectional diameter substantially equal to the cross-sectional diameter of an arrow shaft is positioned in series between the head and nock of a metallic hunting arrow. The transmitter section of the shaft is light in weight so as not to affect the normal flight characteristics of the arrow. The shaft portion between the transmitter and the nock acts as the antenna for the transmitter. A switch is provided for operation of the transmitter. A portable directional radio receiver of the same frequency as the transmitter is utilized by the hunter to track the spent arrow.

8 Claims, 3 Drawing Figures

U.S. Patent  Jun. 23, 1987  4,675,683
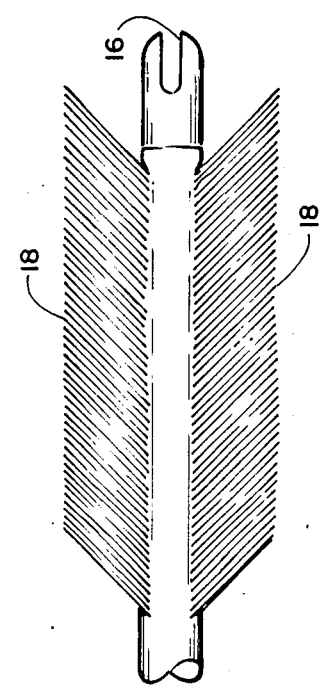
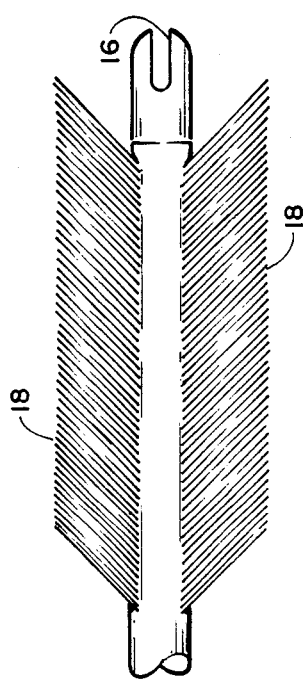
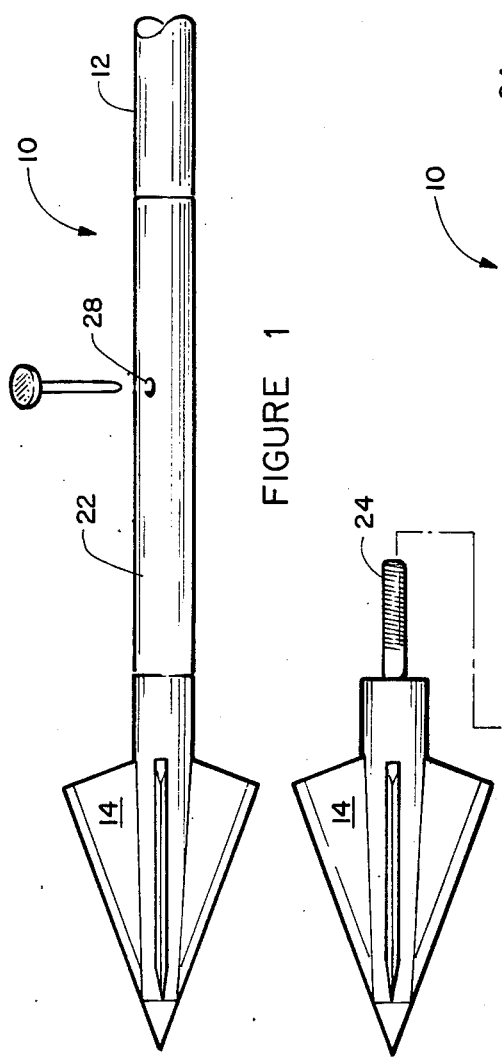
FIGURE 1
FIGURE 2
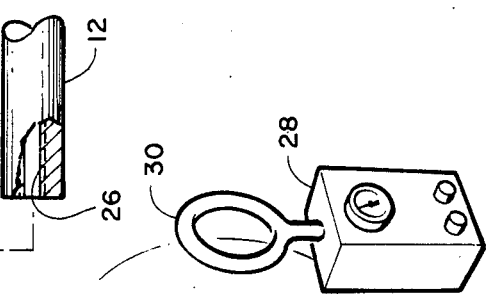
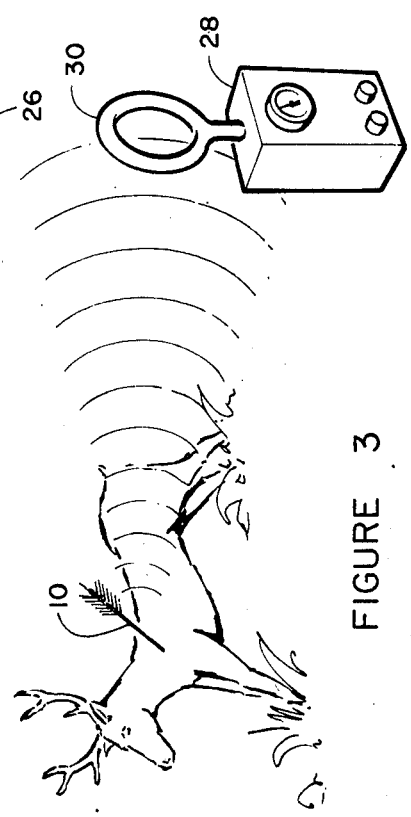
FIGURE 3

SPENT HUNTING ARROW LOCATING MEANS

BACKGROUND OF THE INVENTION

This invention relates to a hunting arrow, and more particularly, to a hunting arrow which is trackable by means of radio signals sent therefrom.

During the hunting of game animals using bow and arrow, on many occasions the arrow will embed itself in the game and the wounded game will immediately flee. In areas of dense foliage it is often difficult to track the wounded game, and on many occasions the wounded game may completely escape with the arrow to an undetectable location.

Prior art solutions to this problem include the release of smoke from a spent arrow, a string or line attached to the arrow which is reeled out when the arrow is released from the bow and an arrow that releases an audible sound when released from the bow. These retrieval means have obvious disadvantages, namely, game in which the arrow is embedded could be at a location where the smoke could not be seen and the audio signal could not be heard. In the other example, the string or line could be broken and the retrieval system rendered useless.

In U.S. Pat. No. 3,790,948 issued to inventor John M. Ralkovich a hunting arrow with a radio transmitter embedded in the arrow head is taught. The transmitter forms a bulbous arrow tip and adds additional weight to the tip or head of the arrow. The arrow shaft is required to be hollow and non-metallic so that the transmitting antenna can be positioned therein.

This device has several disadvantages or drawbacks, namely, the arrow head is not of a standard industry configuration and therefore a standard arrow shaft with a threadedly removable arrow head cannot be utilized; the device cannot be used with a metal arrow shaft hollow or solid as the radio transmission from the transmitter would be shielded and would either emit no radio signals or would emit only minimum signals which would have little or no range; and the transmitter assembly adds additional undesired weight to the tip of the arrow changing its overall balance.

The instant invention advances the art of hunting arrow retrieval.

SUMMARY OF THE INVENTION

In general, the hunting arrow of the present invention includes a metallic shaft having an arrowhead at one end and having on its rearward end a nock or transverse groove adapted to receive the string of a bow. The hunting arrow is provided with the usual fletching or feathering near the rear end of the shaft to aid in guiding the arrow on a steady course during flight.

In accordance with the present invention, the arrow carries a light weight battery powered radio transmitter. In further accordance with the invention, the shaft of the arrow is metallic with conventional threads at its forward end for receiving a correspondingly threaded mating arrowhead. The transmitter is housed in a cylindrical section not unlike the conventional cylindrical arrow shaft. Each end of the transmitter housed tubular section includes either male or female threads which mate with the end of the arrow shaft and the arrowhead and when the cylindrical section is assembled with the arrow shaft and head, has the appearance of a conventional arrow extended in length by the addition of transmitter housed tubular section. In order to achieve substantially the same overall arrow balance, the weight of the transmitter enclosed tubular section is kept to a minimum. The radio signal output of the transmitter is connected to the metallic arrow shaft so that the shaft serves the purpose of the transmitting antenna. In the event of arrow shaft breakage the transmitter assembly can be instantly attached to another arrow shaft and head. A radio receiver, remote from the transmitter is provided as to be carried by the hunter. The radio receiver is tuned to the signal frequency of the transmitter and has a directional antenna and means for finding the direction of the arrow carried transmitter.

An object of the invention is to provide a readily retrievable spent arrow.

Another object of the invention is to provide a readily retrievable spent arrow including a radio transmitter means which does not affect the normal flight characteristics of the arrow.

Still another object of the invention is to provide a retrieval arrow locating means that is readily adaptable to conventional metallic hunting arrows.

These and other objects and novel features of the present invention will be more clearly and fully set forth in the following drawings, specifications and drawings.

BRIEF DESCRIPTION OF THE DRAWINGS

FIG. 1 is a perspective showing of a conventional hunting arrow embodying the invention;

FIG. 2 is an exploded cutaway showing of FIG. 1; and

FIG. 3 is a pictorial showing depicting the application of the invention to the sport of game hunting and includes the direction finding radio receiver.

DETAILED DESCRIPTION OF THE PREFERRED EMBODIMENT

Referring to FIGS. 1 and 2, a hunting arrow 10 is shown which comprises a metallic shaft 12 having an arrowhead 14 at its front end and a nock 16 at its rear end. A trio of fletchings 18 are symmetrically fastened about the shaft adjacent its rear end as is conventioinal with hunting arrows.

The hunting arrow 10 carries a miniature battery 19 and a radio transmitter 20 powered by the battery housed in a tubular section 22 resembling a portion of the arrow shaft 12. The tubular section 22 is located intermediate the arrow shaft and arrowhead.

Conventional metallic arrows include separable heads and shafts. The separation is accomplished by means of male and female engageable thread means 24 and 26 respectively.

The transmitter housed cylindrical section 22 includes arrowhead and shaft mating male and female threaded ends. By removing the arrowhead from the shaft, the tubular section 22 can be mated between the arrowhead and shaft without modification to either.

When the cylindrical section is assembled to the arrowhead and shaft as shown in FIG. 1, the overall appearance is that of a conventional metallic arrow.

It is required that at least the arrow shaft be fabricated of metal or a metallic substance because when engaged to the shaft the transmitter output is connected to the shaft so that the shaft can act as its radiating antenna. A conventional antenna loading adjustment (not shown) compensates for dissimilar shaft lengths.

The radio transmitter tubular section 22 may be constructed of the same material as the arrow shaft or any resilient high-impact plastic or other materials suitable for the purpose intended. Aside from its extreme miniaturization, the transmitter 20 is conventional in design. The transmitter is preferrably crystal controlled on a frequency appropriate to the desired homing range and available antenna length, and may be frequency or amplitude modulated to aid in reception.

Generally, the transmitter 20 and cylindrical section 22 have a combined weight of about 45 grams, the tubular section is generally about three inches in overall exposed length and the transmitter range is at least a quarter of a mile.

It should be understood that the weight and length of the transmitter is extremely light so as not to affect the normal expected flight characteristics of an arrow of this type.

As shown in FIG. 3, the hunter carries a direction finding receiver 28 having a directional antenna 30. The receiver is tuned to the signal frequency of the transmitter so that the direction of the transmitter can be located, as is well known in the art of radio direction finding.

In utilizing the hunting arrow of the present invention, prior to flight, the transmitter is energized by removal of a pin passing through aperture in housing 22 which causes spring brased switch 28 (shown schematically) to close. Thus, when the arrow is shot from the bow, if it misses its mark, it can be readily found by the hunter by merely tracking the transmitted signals. If the arrow hits an animal, the animal can be tracked by the hunter by following the direction of the transmitted signals.

To remove power from the transmitter when not in use, the pin is inserted through the housing apertures forcing switch 28 to an open position (not shown).

Although an illustrative embodiment of the present invention has been shown and described, it should be understood that various substitutions and modifications may be made by those skilled in the art without departing from the novel spirit and scope of the present invention.

What is claimed is:

1. In a metallic hunting arrow of the type comprising a shaft carrying a removable arrowhead at one end thereof and a nock at the other end thereof for driving the arrow, said arrow having an improved locating means comprising:
   a miniaturized battery powered radio tramsitter, positioned intermediate said arrowhead end and nock, said transmitter is enclosed within a cylindrical housing substantially equal in cross-section to the shaft and forms an extension thereof and the shaft portion between said transmitter and said nock acts as the radiating antenna for said transmitter.

2. The metallic hunting arrow as defined in claim 1 wherein the end of the shaft opposite said nock end is threaded to engage threads on one end of said housing and the opposite end of said housing includes threads that mate with threads on said arrowhead.

3. The hunting arrow as defined in claim 1 further comprises an external means of activating said transmitter which does not extend from the housing when the transmitter is activated.

4. A hunting arrow as defined in claim 1 further comprising a radio receiver remote from said transmitter and tuned to the signal frequency of said transmitter, said receiver having a directional antenna and means for locating the direction of the arrow carrying said transmitter.

5. A hunting arrow as defined in claim 1 wherein the weight of said transmitter section is sufficiently light so as not to adversely affect the normal flight characteristics of said arrow.

6. A method for tracking a metallic arrow with an arrowhead at one end and a nock at the other end of a shaft fired from a bow which comprises the steps of:
   connecting a battery-powered radio transmitter including an antenna, said transmitter having a cross section substantially equal to the cross-section of said shaft in series between said arrowhead and said shaft forming a continuation of the length of said shaft;
   shooting the arrow in the direction of the intended target a portion of said shaft of said arrow is connected to said antenna whereby said shaft transmitts a radio signal; and
   tracking said signal by a radio receiver tuned to the signal frequency of said transmitter, with said receiver having a Directional Antenna to permit the direction of the transmitted signal to be detected and observed.

7. A method for tracking spent arrows as described in claim 6 including the step of carrying the receiver and finding the direction of the transmitted signals after the arrow is shot.

8. In a hunting arrow having a metal shaft carrying an arrowhead at one end thereof and a nock at the other end thereof comprising:
   A battery operated radio transmitter positioned in series between said arrowhead and said shaft, said transmitter having substantialy the same circumference as said shaft and is sufficiently light in weight and the shaft acts as a transmitting antenna and the expected aerodynamics and stability of the arrow are maintained.

* * * * *